United States Patent
Yamagishi

(10) Patent No.: US 9,769,503 B2
(45) Date of Patent: Sep. 19, 2017

(54) INFORMATION PROCESSOR, INFORMATION PROCESSING METHOD AND PROGRAM

(71) Applicant: Saturn Licensing LLC, New York, NY (US)

(72) Inventor: Yasuaki Yamagishi, Kanagawa (JP)

(73) Assignee: Saturn Licensing LLC, New York, NY (US)

( * ) Notice: Subject to any disclaimer, the term of this patent is extended or adjusted under 35 U.S.C. 154(b) by 11 days.

(21) Appl. No.: 13/934,924

(22) Filed: Jul. 3, 2013

(65) Prior Publication Data

US 2014/0137165 A1    May 15, 2014

Related U.S. Application Data

(60) Provisional application No. 61/726,416, filed on Nov. 14, 2012.

(51) Int. Cl.
  *H04N 21/214* (2011.01)
  *H04N 21/414* (2011.01)
  (Continued)

(52) U.S. Cl.
  CPC ... *H04N 21/2143* (2013.01); *G06F 17/30784* (2013.01); *H04L 12/2812* (2013.01);
  (Continued)

(58) Field of Classification Search
  CPC ........... H04N 21/4622; H04N 21/4126; H04N 21/42209; H04N 21/42207
  See application file for complete search history.

(56) References Cited

U.S. PATENT DOCUMENTS 6,567,984 B1 *   5/2003   Allport ................ 725/110
2008/0016177 A1   1/2008   Jin et al.
(Continued)

FOREIGN PATENT DOCUMENTS

CA   2 814 197 A1   5/2012
JP   2006-050237   2/2006
(Continued)

OTHER PUBLICATIONS

International Search Report issued Jan. 28, 2014, in PTC/JP2013/079734, filed Nov. 1, 2013 with English translation.
(Continued)

*Primary Examiner* — Nathan Flynn
*Assistant Examiner* — Alexander Q Huerta
(74) *Attorney, Agent, or Firm* — Oblon, McClelland, Maier & Neustadt, L.L.P.

(57) ABSTRACT

An information processor making up a home network system together with a terminal device. The information processor includes an identification request processing section, a publishing section, and a command execution section. The identification request processing section is configured to extract, from reproduced content, signature data indicating the features of the content, generate a query including at least the extracted signature data and transmit the query to an identification server so as to receive a response indicating the identification result of the reproduced content returned from the identification server in response to the query. The publishing section is configured to publish, to the terminal device, a command to operate the identification request processing section from the terminal device. The command execution section is configured to operate the identification request section in response to the command from the terminal device so as to transfer the response to the terminal device.

19 Claims, 9 Drawing Sheets

(51) Int. Cl.
  *H04L 12/28* (2006.01)
  *H04N 21/41* (2011.01)
  *H04N 21/436* (2011.01)
  *H04N 21/4363* (2011.01)
  *H04N 21/44* (2011.01)
  *H04N 21/4722* (2011.01)
  *G06F 17/30* (2006.01)

(52) U.S. Cl.
  CPC ... *H04N 21/4126* (2013.01); *H04N 21/41407* (2013.01); *H04N 21/43615* (2013.01); *H04N 21/43637* (2013.01); *H04N 21/44008* (2013.01); *H04N 21/4722* (2013.01); *H04L 2012/2849* (2013.01)

(56) References Cited

U.S. PATENT DOCUMENTS

| | | | |
|---|---|---|---|
| 2008/0092211 A1 | 4/2008 | Klemets et al. | |
| 2009/0144787 A1* | 6/2009 | Hwang | H04N 21/43615 725/109 |
| 2011/0075990 A1 | 3/2011 | Eyer | |
| 2011/0088075 A1 | 4/2011 | Eyer | |
| 2011/0167468 A1* | 7/2011 | Lee | H04N 5/44 725/132 |
| 2011/0243536 A1 | 10/2011 | Eyer | |
| 2011/0246488 A1 | 10/2011 | Eyer | |
| 2011/0247028 A1 | 10/2011 | Eyer | |
| 2011/0247044 A1* | 10/2011 | Jacoby | H04N 21/4351 725/115 |
| 2011/0252443 A1* | 10/2011 | Tiddens | H04N 21/4126 725/38 |
| 2011/0298981 A1 | 12/2011 | Eyer | |
| 2011/0299827 A1 | 12/2011 | Eyer | |
| 2011/0302599 A1 | 12/2011 | Eyer | |
| 2011/0302611 A1 | 12/2011 | Eyer | |
| 2011/0307920 A1 | 12/2011 | Blanchard et al. | |
| 2012/0044418 A1 | 2/2012 | Eyer | |
| 2012/0047531 A1 | 2/2012 | Eyer | |
| 2012/0050619 A1 | 3/2012 | Kitazato et al. | |
| 2012/0050620 A1 | 3/2012 | Kitazato | |
| 2012/0054214 A1 | 3/2012 | Yamagishi et al. | |
| 2012/0054235 A1 | 3/2012 | Kitazato et al. | |
| 2012/0054267 A1 | 3/2012 | Yamagishi et al. | |
| 2012/0054268 A1 | 3/2012 | Yamagishi | |
| 2012/0054783 A1 | 3/2012 | Yamagishi | |
| 2012/0054784 A1 | 3/2012 | Kitazato et al. | |
| 2012/0054816 A1 | 3/2012 | Dewa | |
| 2012/0060197 A1 | 3/2012 | Kitahara et al. | |
| 2012/0063508 A1 | 3/2012 | Hattori et al. | |
| 2012/0063635 A1 | 3/2012 | Matsushita et al. | |
| 2012/0072965 A1 | 3/2012 | Dewa | |
| 2012/0081508 A1 | 4/2012 | Kitazato | |
| 2012/0081607 A1 | 4/2012 | Kitazato | |
| 2012/0082266 A1 | 4/2012 | Kitazato et al. | |
| 2012/0082440 A1 | 4/2012 | Kitazato | |
| 2012/0084802 A1 | 4/2012 | Kitazato | |
| 2012/0084824 A1 | 4/2012 | Kitazato | |
| 2012/0084829 A1 | 4/2012 | Kitazato | |
| 2012/0144416 A1* | 6/2012 | Wetzer et al. | 725/14 |
| 2012/0177067 A1 | 7/2012 | Cho et al. | |
| 2012/0185888 A1 | 7/2012 | Eyer et al. | |
| 2012/0233651 A1* | 9/2012 | Lee et al. | 725/110 |
| 2012/0253826 A1 | 10/2012 | Kitazato et al. | |
| 2012/0274848 A1 | 11/2012 | Kitahara et al. | |
| 2012/0275764 A1 | 11/2012 | Eyer | |
| 2012/0324495 A1* | 12/2012 | Matthews, III | H04H 60/372 725/14 |
| 2013/0024894 A1 | 1/2013 | Eyer | |
| 2013/0024897 A1 | 1/2013 | Eyer | |
| 2013/0031569 A1 | 1/2013 | Kitazato et al. | |
| 2013/0036440 A1 | 2/2013 | Eyer | |
| 2013/0055313 A1 | 2/2013 | Eyer | |
| 2013/0070152 A1* | 3/2013 | Berkowitz | H04N 21/235 348/500 |
| 2013/0071090 A1* | 3/2013 | Berkowitz et al. | 386/248 |
| 2013/0103716 A1 | 4/2013 | Yamagishi | |
| 2013/0145414 A1* | 6/2013 | Yamagishi | H04N 21/23 725/110 |
| 2013/0198768 A1* | 8/2013 | Kitazato | G06F 13/00 725/19 |
| 2014/0006474 A1* | 1/2014 | White | H04N 5/44543 709/201 |
| 2014/0006562 A1* | 1/2014 | Handa | H04L 67/02 709/219 |
| 2014/0137152 A1* | 5/2014 | Adachi | H04N 21/47217 725/34 |
| 2014/0173661 A1* | 6/2014 | Yamagishi | H04N 21/431 725/43 |
| 2015/0012937 A1* | 1/2015 | Yamagishi | H04N 21/44008 725/32 |

FOREIGN PATENT DOCUMENTS

| | | |
|---|---|---|
| JP | 2012-15980 A | 1/2012 |
| JP | 2012-65052 A | 3/2012 |
| JP | 2012-168801 | 9/2012 |

OTHER PUBLICATIONS

U.S. Appl. No. 13/559,188, filed Jul. 26, 2012, Kitazato.
U.S. Appl. No. 13/587,975, filed Aug. 17, 2012, Kitazato.
U.S. Appl. No. 13/593,554, filed Aug. 24, 2012, Kitazato et al.
U.S. Appl. No. 13/708,313, filed Dec. 7, 2012, Kitazato et al.
U.S. Appl. No. 13/741,863, filed Jan. 15, 2013, Kitazato et al.
U.S. Appl. No. 13/753,591, filed Jan. 30, 2013, Kitazato et al.
U.S. Appl. No. 13/777,429, filed Feb. 26, 2013, Kitazato et al.
U.S. Appl. No. 13/777,693, filed Feb. 26, 2013, Kitazato et al.
U.S. Appl. No. 13/777,734, filed Feb. 26, 2013, Kitazato et al.
U.S. Appl. No. 13/782,694, filed Mar. 1, 2013, Eyer.
U.S. Appl. No. 13/782,730, filed Mar. 1, 2013, Eyer.
U.S. Appl. No. 13/800,818, filed Mar. 13, 2013, Eyer.
U.S. Appl. No. 13/800,734, filed Mar. 13, 2013, Eyer.
U.S. Appl. No. 13/841,343, filed Mar. 15, 2013, Eyer.
U.S. Appl. No. 13/846,282, filed Mar. 18, 2013, Dewa et al.
U.S. Appl. No. 13/846,247, filed Mar. 18, 2013, Kitazato et al.
U.S. Appl. No. 13/888,865, filed May 7, 2013, Kitahara et al.
U.S. Appl. No. 13/894,779, filed May 15, 2013, Yamagishi.
U.S. Appl. No. 13/905,721, filed May 30, 2013, Kitahara et al.
U.S. Appl. No. 13/915,664, filed Jun. 12, 2013, Eyer.
U.S. Appl. No. 13/930,814, filed Jun. 28, 2013, Fay.
U.S. Appl. No. 13/930,880, filed Jun. 28, 2013, Fay et al.
U.S. Appl. No. 13/924,907, filed Jun. 24, 2013, Eyer.
U.S. Appl. No. 13/927,667, filed Jun. 26, 2013, Yamagishi.
Extended European Search Report issued Jul. 7, 2016 in Patent Application No. 13854370.7.
"UPnP™ Forum Device Architecture 1.1", UPNP, Oct. 15, 2008, XP055143319, 136 Pages.

\* cited by examiner

FIG. 6B

| ACR QUERY IDENTIFIER | ~121 |
| SERVICE IDENTIFIER | ~122 |
| IDENTIFICATION FAILURE FLAG | ~130 |
| ORIGINATOR ADDRESS | ~128 |
| SIGNATURE | ~129 |

| ACR QUERY IDENTIFIER | ~121 |
| SIGNATURE SCHEME IDENTIFIER | ~122 |
| SERVICE IDENTIFIER | ~123 |
| CONTENT IDENTIFIER | ~124 |
| REPRODUCTION TIME | ~125 |
| LOCAL TIME STAMP | ~126 |
| RELATED META DATA (LINKED APPLICATION IDENTIFIER) | ~127 |
| ORIGINATOR ADDRESS | ~128 |
| SIGNATURE | ~129 |

↙ 120

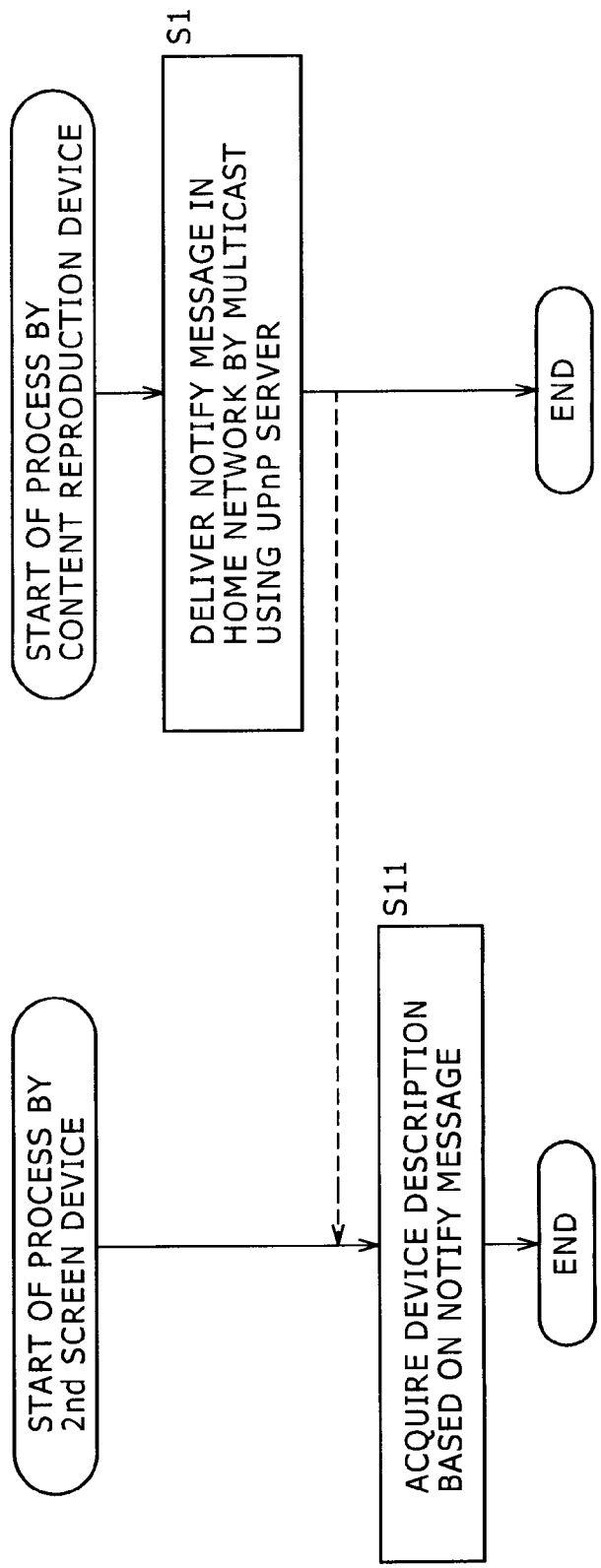

INFORMATION PROCESSOR, INFORMATION PROCESSING METHOD AND PROGRAM

CROSS-REFERENCE TO RELATED APPLICATION

This application claims the benefit of priority of Provisional Application Ser. No. 61/726,416, filed Nov. 14, 2012, the entire contents of which is incorporated herein by reference.

BACKGROUND

The present disclosure relates to an information processor, information processing method and program and, more particularly, to an information processor, information processing method and program suitable for electronic devices making up a home network to notify information about installed ACR (Automatic Content Recognition) clients to each other.

We consider, for example, a case in which information relating to a TV (television) program being broadcast (e.g., cast, outline and preview of next installment) and that not relating thereto but useful to viewers (e.g., news, weather forecast and traffic information) is displayed on the screen for the viewers of the TV (television) program (hereinafter simply referred to as the program).

In order to accomplish this, it is only necessary to transmit, to TV receivers and other devices, a command used to acquire a dedicated application program (hereinafter abbreviated as an application) and that used to activate the application in response to the progress of the program. In fact, this has already been made available in Japan and Europe by transmitting the commands and applications using a data broadcasting band in the TV broadcasting signal (refer, for example, to Japanese Patent Laid-Open No. 2006-50237).

In the United States, on the other hand, no data broadcasting band is set aside in the TV broadcasting signal, with no alternative methodology established. As a result, the execution of an application in response to the progress of a program has yet to become a reality.

It should be noted that there are more households viewing programs through CATV and IPTV than those doing so by directly receiving TV broadcasting waves with their TV receivers in the United States. In CATV and IPTV, only video and audio signals of the program may be extracted from the TV broadcasting signal for delivery. Therefore, even if a data broadcasting band is set aside in the TV broadcasting signal in the United States, there is no guarantee that the data broadcasting signal including data relating to the application will be carried to the receivers.

Further, there is a recent need to execute an application in response to the progress of not only a program being broadcast but also that of a recorded program, a video reproduced from a package media such as DVD or BD, and a moving image and music downloaded from the Internet (these will be hereinafter referred to as content) during viewing.

In order to meet this need, it is necessary to identify content being viewed. A technique called ACR (Automatic Content Recognition) service is available as a possible approach to doing so (refer, for example, to Japanese Patent Laid-Open No. 2012-168801).

ACR service is implemented by an ACR client and ACR server. The ACR client installed in a content reproduction device such as TV receiver extracts signature data (e.g., watermark and fingerprint) from viewed content, notifying the ACR server of the signature data and requesting it to identify the content. The ACR server compares the notified signature data against the signature data of content registered in advance in a database, identifying the content viewed on the content reproduction device. Further, the ACR server sends, to the ACR client, meta data relating to the identified content and the application to be executed (hereinafter referred to as the linked application) as an ACR response.

Then, the content reproduction device installed with the ACR client that has received this response acquires a linked application from a given server and executes the application.

SUMMARY

Incidentally, a TV receiver is placed as a display output device for an external device such as CATV or IPTV settop box as a result of the widespread use of CATV and IPTV in the United States as described above. Therefore, users hardly have opportunities to manipulate the remote controllers (hereinafter referred to as remotes) of their TV receivers. Instead, they often manipulate the remotes of the external devices. As a consequence, the execution of a linked application in a TV receiver serving as a content reproduction device manipulated by the TV receiver's remote may not probably be an easy-to-do task for users.

Therefore, a need has arisen to display, on a second screen device different from a content reproduction device installed with an ACR client (e.g., TV receiver), meta data relating to content being viewed on the content reproduction device or execute a linked application. Here, among second screen devices are, for example, tablet terminals, slate PCs, smartphones or the like.

Further, recent years have seen those allowing operation of the external device using a given application program activated on a second screen device, that is, those allowing a second screen device to be used as a remote of the external device. Therefore, it is desirable to meet the above need from the viewpoint of integrating user interfaces into a second screen device as well.

It should be noted that it is necessary to coordinate a content reproduction device such as TV receiver installed with an ACR client and a second screen device in order to meet the above need. However, both content reproduction devices and second screen devices are manufactured and sold by a number of vendors. Therefore, we should also consider a case in which a content reproduction device from one vendor is used in combination with a second screen device from another vendor. In this case, the standardization of protocols and APIs (Application Program Interfaces) is an urgent necessity to accomplish the above coordination.

The present disclosure has been made in light of the foregoing, and it is an object of the present disclosure to propose a standard protocol for coordination between a content reproduction device and second screen device in using ACR services.

An information processor according to a first aspect of the present disclosure makes up a home network system together with a terminal device and includes an identification request processing section, publishing section and command execution section. The identification request processing section extracts, from reproduced content, signature data indicating the features of the content, generates a query including at least the extracted signature data and transmits the query to an identification server, receiving a response indicating the identification result of the reproduced content returned from the identification server in response to the query. The publishing section publishes, to the terminal device, a command to operate the identification request processing section from the terminal device. The command execution section operates the identification request section in response to the command from the terminal device, transferring the response to the terminal device.

The publishing section can publish, to the terminal device, device description in which the URL of the command is directly described.

The publishing section can directly describe the URL of the command in the device description with expanded UPnP regulations and publish the device description to the terminal device.

The command can be WebAPI or WebSocket.

The publishing section can deliver a Notify message by multicast in the home network and publish the device description to the terminal device in response to access from the terminal device based on the Notify message.

The publishing section can publish the device description to the terminal device in response to M-Search from the terminal device.

The response can include related meta data associated with the identified content.

An information processing method according to the first aspect of the present disclosure is information processing of an information processor that makes up a home network system together with a terminal device and includes an identification request processing section. The identification request processing section extracts, from reproduced content, signature data indicating the features of the content, generates a query including at least the extracted signature data and transmits the query to an identification server, receiving a response indicating the identification result of the reproduced content returned from the identification server in response to the query. The information processing method includes a publishing step and command execution step performed by the information processor. The publishing step publishes, to the terminal device, a command to operate the identification request processing section from the terminal device. The command execution step operates the identification request section in response to the command from the terminal device, transferring the response to the terminal device.

A program according to the first aspect of the present disclosure causes a computer making up a home network system together with a terminal device to serve as an identification request processing section, publishing section and command execution section. The identification request processing section extracts, from reproduced content, signature data indicating the features of the content, generates a query including at least the extracted signature data and transmits the query to an identification server, receiving a response indicating the identification result of the reproduced content returned from the identification server in response to the query. The publishing section publishes, to the terminal device, a command to operate the identification request processing section from the terminal device. The command execution section operates the identification request section in response to the command from the terminal device, transferring the response to the terminal device.

In the first aspect of the present disclosure, a command to operate an identification request processing section from a terminal device is published to the terminal device. The identification request section is operated in response to the command from the terminal device, and the response is transferred to the terminal device.

An information processor according to a second aspect of the present disclosure makes up a home network system together with a content reproduction device that includes an identification request processing section. The identification request processing section extracts, from reproduced content, signature data indicating the features of the content, generates a query including at least the extracted signature data and transmits the query to an identification server, receiving a response indicating the identification result of the reproduced content returned from the identification server in response to the query. The information processor includes a command acquisition section and linked application execution section. The command acquisition section acquires a command to operate the identification request processing section of the content reproduction device from the content reproduction device, receiving the response transferred from the content reproduction device by invoking the command. The linked application execution section acquires and executes a linked application to be executed in step with the progress of the content based on related meta data included in the received response and associated with the identified content.

The command acquisition section can acquire the URL of the command directly described in a device description published by the content reproduction device.

The command acquisition section can acquire the URL of the command directly described in a device description with expanded UPnP regulations published by the content reproduction device.

The command can be WebAPI or WebSocket.

The command acquisition section can acquire the device description from the content reproduction device based on a Notify message delivered by multicast in the home network by the content reproduction device.

The command acquisition section can acquire the device description searched for through M-Search and supplied from the content reproduction device.

The linked application execution section can further present, to the user, meta data of the content based on related meta data included in the received response and associated with the identified content.

An information processing method according to the second aspect of the present disclosure is information processing method of an information processor that makes up a home network system together with a content reproduction device that includes an identification request processing section. The identification request processing section extracts, from reproduced content, signature data indicating the features of the content, generates a query including at least the extracted signature data and transmits the query to an identification server, receiving a response indicating the identification result of the reproduced content returned from the identification server in response to the query. The information processing method includes an acquisition step, reception step and linked application execution step performed by the information processor. The acquisition step acquires a command to operate the identification request processing section of the content reproduction device from the content reproduction device. The reception step receives the response transferred from the content reproduction device by invoking the command. The linked application execution step acquires and executes a linked application to be executed in step with the progress of the content based on related meta data included in the received response and associated with the identified content.

A program according to the second aspect of the present disclosure causes a computer making up a home network system together with a content reproduction device that includes an identification request processing section to serve as a command acquisition section and linked application execution section. The identification request processing section extracts, from reproduced content, signature data indicating the features of the content, generates a query including at least the extracted signature data and transmits the query to an identification server, receiving a response indicating the identification result of the reproduced content returned from the identification server in response to the query. The command acquisition section acquires a command to operate the identification request processing section of the content reproduction device from the content reproduction device, receiving the response transferred from the content reproduction device by invoking the command. The linked application execution section acquires and executes a linked application to be executed in step with the progress of the content based on related meta data included in the received response and associated with the identified content.

In the second aspect of the present disclosure, a command to operate an identification request processing section of a content reproduction device is acquired from the content reproduction device. A response transferred from the content reproduction device is received by invoking the command. A linked application to be executed in step with the progress of the content is acquired and executed based on related meta data included in the received response and associated with the identified content.

An information processing method according to a third aspect of the present disclosure is an information processing method of a home network system made up of a content reproduction device and terminal device. The content reproduction device includes an identification request processing section. The identification request processing section extracts, from reproduced content, signature data indicating the features of the content, generates a query including at least the extracted signature data and transmits the query to an identification server, receiving a response indicating the identification result of the reproduced content returned from the identification server in response to the query. The information processing method includes a publishing step performed by the content reproduction device, an acquisition and invoking step performed by the terminal device, a transfer step performed by the content reproduction device and a linked application execution step performed by the terminal device. The publishing step publishes a command to operate the identification request processing section from the terminal device. The acquisition and invoking step acquires and invokes the command published by the content reproduction device. The transfer step operates the identification request section in response to the invoking of the command by the terminal device and transfers the response to the terminal device. The linked application execution step receives the transferred response and acquires and executes a linked application to be executed in step with the progress of the content based on related meta data included in the response and associated with the identified content.

In the third aspect of the present disclosure, a command to operate an identification request processing section from a terminal device is published by the content reproduction device. The command published by the content reproduction device is acquired and invoked by the terminal device. The identification request processing section is operated by the content reproduction device in response to the invoking of the command by the terminal device, and the response is transferred to the terminal device. The transferred response is received, and a linked application to be executed in step with the progress of the content is acquired and executed by the terminal device based on related meta data included in the response and associated with the identified content.

The first aspect of the present disclosure allows publishing a command to operate an identification request processing section from a terminal device.

The second aspect of the present disclosure allows an identification request processing section of a content reproduction device to be operated by invoking published content.

The third aspect of the present disclosure permits coordination between a content reproduction device and terminal device making up a home network.

BRIEF DESCRIPTION OF THE DRAWINGS

FIGS. 6A and 6B are diagrams illustrating the data structure of an ACR response;

FIG. 7 is a flowchart describing preprocesses performed by a home network system;

DETAILED DESCRIPTION OF THE PREFERRED EMBODIMENTS

A detailed description will be given below of the best mode for carrying out the present disclosure (hereinafter referred to as the embodiment) with reference to the accompanying drawings.

[Configuration Example of the ACR Service Utilization System]

Figure 1:
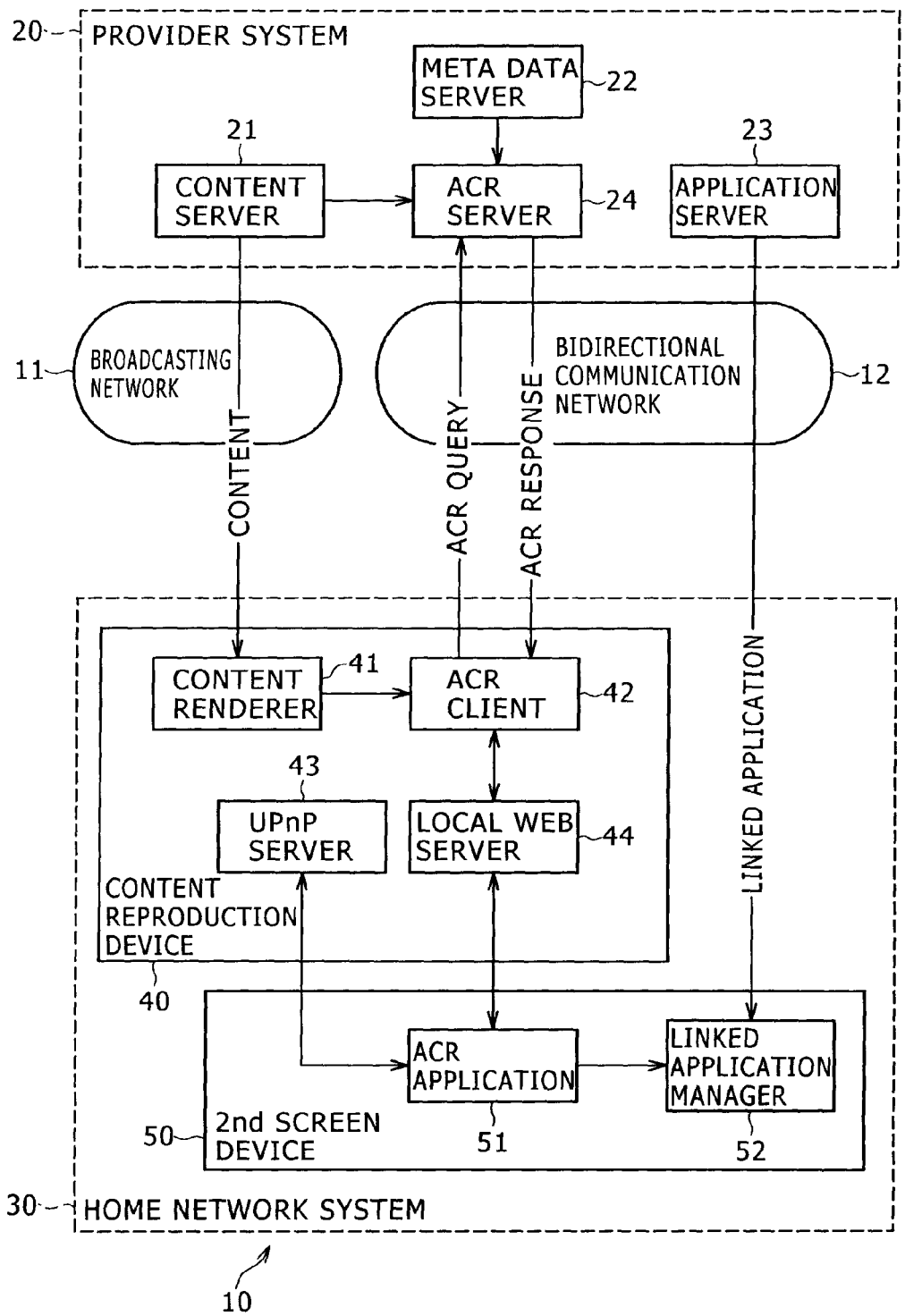
FIG. 1 is a block diagram illustrating a configuration example of an ACR service utilization system, i.e., an embodiment of the present disclosure.

FIG. 1 illustrates a configuration example of an ACR service utilization system, i.e., an embodiment of the present disclosure.

An ACR service utilization system 10 identifies content viewed by the user on the screen of a content reproduction device 40 such as TV receiver, thus presenting meta data relating to the content to the user on a second screen device 50 and executing a linked application in step with the progress of the content.

Here, the term "content" is not limited to a program being broadcast and includes, for example, all kinds of AV content including a program recorded to and reproduced from an external device such as video recorder connected to the content reproduction device 40, a video such as movie reproduced from a package media, and a moving image and music downloaded via the Internet. Further, commercial messages (hereinafter referred to as CMs) inserted between programs and within the same program are also included in content.

Content is identified by ACR (Automatic Content Recognition) which is accomplished by comparing signature data (e.g., watermark and fingerprint) extracted periodically from the content being viewed and indicating the features of the content against signature data of content registered in advance in a database.

The ACR service utilization system 10 includes a provider system 20 and home network system 30. The provider system 20 supplies, for example, content and a linked application associated therewith. The home network system 30 is provided on the side of the user who views the content and uses the linked application. The provider system 20 and home network system 30 are connected to each other via a broadcasting network 11 and bidirectional communication network 12. Here, the term "broadcasting network 11" includes TV broadcasting, CATV and IPTV networks. The term "bidirectional communication network 12" refers to an IP communication network typified by the Internet.

[Description of the Provider System 20]

The provider system 20 includes a content server 21, meta data server 22, application server 23 and ACR server 24.

The content server 21 broadcasts content such as programs and CMs via the broadcasting network 11. Further, the content server 21 supplies content to be broadcast to the ACR server 24. It should be noted that a content identifier and signature data extracted in advance from content may be supplied to the ACR server 24 rather than supplying the content.

The meta data server 22 supplies meta data associated with content to be broadcast from the content server 21 to the ACR server 24. Meta data includes, for example, a variety of information about the content, an identifier indicating a linked application to be executed in step with the progress of the content, and data used in the linked application.

The application server 23 supplies an application and data used in the application via the bidirectional communication network 12 in response to a request from the second screen device 50 of the home network system 30.

The ACR server 24 has ACR reference data organized in advance into a database. In ACR reference data, signature data, extracted at given sampling intervals from each of a variety of content which can be viewed by the content reproduction device 40 of the home network system 30, is associated, for example, with a content identifier and application identifier. The ACR server 24 generates an ACR response in response to an ACR query transmitted from an ACR client 42 of the content reproduction device 40 based on the database of the ACR reference data, returning the ACR response.

It should be noted that the content server 21, meta data server 22, application server 23 and ACR server 24 making up the provider system 200 may be arranged in a concentrated manner at a single location or arranged in a distributed manner. Alternatively, some thereof may be combined as appropriate. Still alternatively, there may be a plurality of each of these servers.

[Description of the Home Network System 30]

The home network system 30 includes the content reproduction device 40 such as TV receiver and second screen device 50 such as tablet terminal, slate PC or smartphone. It should be noted that there may be the plurality of content reproduction devices 40 and the plurality of second screen devices 50 in the home network system 30. We assume that the content reproduction device 40 and second screen device 50 are connected to each other, for example, by a wireless LAN.

The content reproduction devices 40 is used primarily to view content and has a content renderer 41, ACR client 42, UPnP (Universal Plug and Play) server 43 and local web server 44.

The content renderer 41 acquires all content displayed on the display of the content reproduction device 40 (e.g., TV receiver), diverting and supplying the content to the ACR client 42. That is, the content renderer 41 acquires not only content broadcast from the content server 21 but also that fed via various input terminals (e.g., HDMI terminal) of the content reproduction device 40, diverting and supplying the content to the ACR client 42.

The ACR client 42 extracts, from content fed from the content renderer 41, signature data indicating the features of the content at given sampling intervals. Here, the same extracting method (which will be described later) is used to extract signature data as that used by the ACR server 24 of the provider system 20.

Further, the ACR client 42 generates an ACR query including the extracted signature data, transmitting the query to the ACR server 24 of the provider system 20 via the bidirectional communication network 12. Still further, the ACR client 42 receives the ACR response returned from the ACR server 24 in response to the transmitted ACR query, holding the ACR response.

The UPnP server 43 makes public the details of the WebAPI (Application Program Interface), i.e., an interface adapted to invoke the function of the content reproduction device 40 (utilizing the ACR service with the ACR client 42 in this case) installed with the UPnP server 43, to the other device (second screen device 50 in this case) making up the home network system 30 together with the content reproduction device 40. More specifically, a new protocol is defined in a basic protocol provided by a common UPnP server, and the details are made public using the new protocol (a detailed description will be given later).

The local web server 44 allows the other device (second screen device 50 in this case) making up the home network system 30 together with the content reproduction device 40 to use the function of the content reproduction device 40 (utilizing the ACR service through the ACR client 42 in this case, in this case) installed with the local web server 44. More specifically, the local web server 44 controls the ACR client 42 to use the ACR service in response to the invoking of the API notified by the UPnP server 43, transferring the ACR response returned from the ACR server 24 to the second screen device 50.

In the present embodiment, the second screen device 50 primarily presents meta data of content viewed on the content reproduction device 40 to the user and executes a linked application in step with the progress of the content. The second screen device 50 has an ACR application 51 and linked application manager 52.

The ACR application 51 is installed in advance in the second screen device 50 and activated to use the ACR service in coordination with the content reproduction device 40. The ACR application 51 acquires, from the UPnP server 43, an API adapted to read the function to use the ACR service, acquiring, via the local web server 44, the ACR response from the ACR server 24 received by the ACR client 42 by invoking the API. Further, the ACR application 51 analyzes the acquired ACR response, notifying the analysis result to the linked application manager 52.

The linked application manager 52 presents meta data included in the ACR response to the user or acquires, from the application server 23 via the bidirectional communication network 12, a linked application associated with content viewed on the content reproduction device 40 and executes the application in response to the notification from the ACR application 51. It should be noted that a web browser can be used as the linked application manager 52.

[Detailed Configuration Example of The ACR Server 24]

Figure 2:
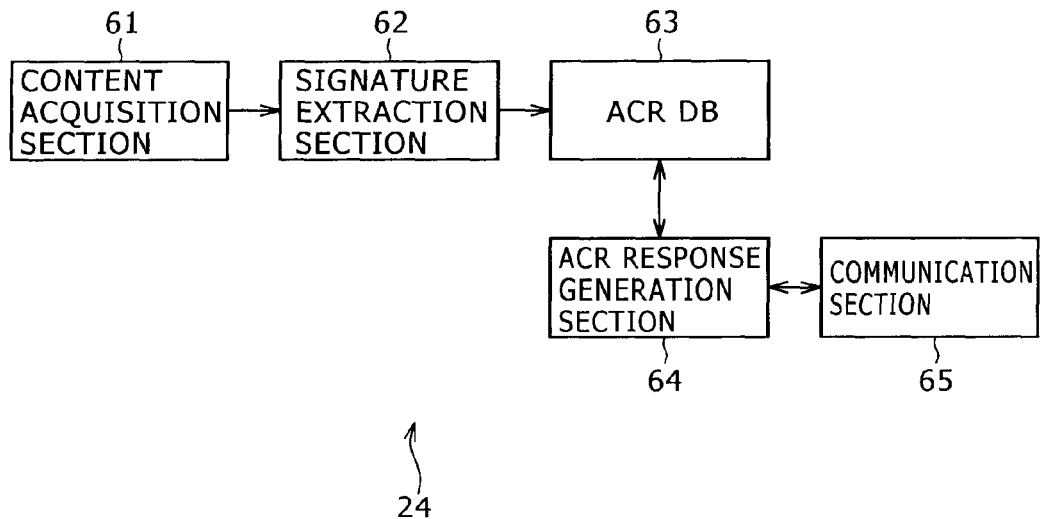
FIG. 2 is a block diagram illustrating a configuration example of an ACR server.

FIG. 2 illustrates a detailed configuration example of the ACR server 24 included in the provider system 20.

The ACR server 24 includes a content acquisition section 61, signature extraction section 62, ACR database (DB) 63, ACR response generation section 64 and communication section 65.

The content acquisition section 61 acquires, from the content server 21 or the like, content scheduled to be broadcast by the content server 21 via the broadcasting network 11 or a variety of content that can be viewed on the content reproduction device 40, supplying the acquired content to the signature extraction section 62. The signature extraction section 62 extracts, using a given extraction method, signature data indicating the features of the content supplied from the content acquisition section 61 from the same content at given sampling intervals, outputting the signature data to the ACR database 63.

The signature extraction section 62 can extract signature data by an arbitrary existing method. For example, a watermark embedded in content in advance may be extracted for use as signature data. Alternatively, a fingerprint may be calculated for use as signature data.

Using a fingerprint as signature data provides signature data that remains unchanged even in the event of a change in resolution, aspect ratio, bit rate, coding format of content or the like. Therefore, identification of content based on this signature data provides improved identification accuracy.

It should be noted that if there are the plurality of ACR servers 24, each signature extraction sections 62 need not necessarily use the same method to extract signature data. Each of the ACR servers 24 may use an arbitrary method to extract signature data.

The ACR database 63 generates, for each piece of signature data fed from the signature extraction section 62, ACR reference data that is associated with a content identifier or the like, indicating content from which the piece of signature data was extracted, storing the ACR reference data. This allows signature data extracted from content to be organized into a database. The data structure of ACR reference data will be described in detail later with reference to FIG. 4.

The ACR response generation section 64 identifies content from which signature data, included in the ACR query transmitted from the ACR client 42, was extracted by referencing the ACR database 63. Further, the ACR response generation section 64 generates an ACR response including a content identifier and related meta data or the like as an identification result. The data structure of an ACR response will be described later with reference to FIG. 6. The communication section 65 receives an ACR query transmitted from the ACR client 42 and outputs the ACR query to the ACR response generation section 64, and transmits an ACR response generated by the ACR response generation section 64 to the ACR client 42.

[Detailed Configuration Example of the ACR Client 42]

Figure 3:
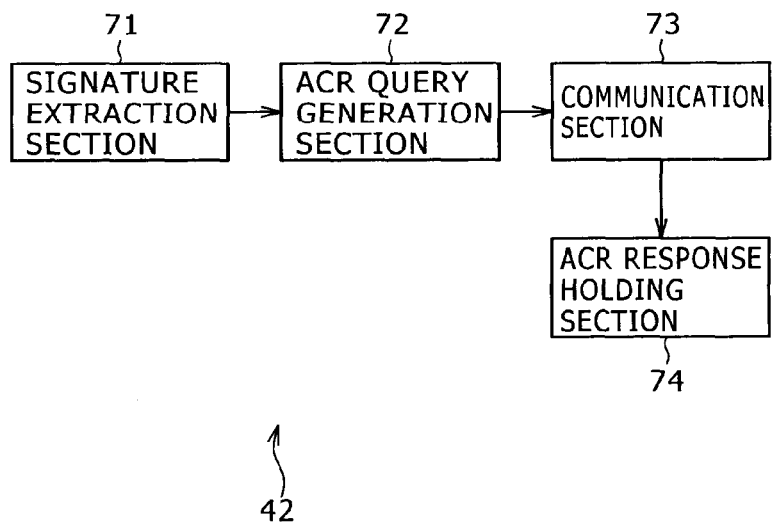
FIG. 3 is a block diagram illustrating a configuration example of an ACR client.

FIG. 3 illustrates a detailed configuration example of the ACR client 42 installed in the content reproduction device 40.

The ACR client 42 includes a signature extraction section 71, ACR query generation section 72, communication section 73 and ACR response holding section 74.

The signature extraction section 71 extracts, from the content diverted and supplied from the content renderer 41, signature data indicating the features of the content at given sampling intervals, outputting the signature data to the ACR query generation section 72. It should be noted that the signature extraction section 71 extracts signature data by the same method as used by the signature extraction section 62 of the ACR server 24.

The ACR query generation section 72 generates an ACR query including the signature data extracted by the signature extraction section 71. The ACR query is used to request the ACR server 24 to identify the content. The data structure of the ACR query will be described later with reference to FIG. 5.

The communication section 73 transmits the ACR query, generated by the ACR query generation section 72, to the ACR server 24 and receives an ACR response returned from the ACR server 24, outputting the ACR response to the ACR response holding section 74. The ACR response holding section 74 holds the ACR response received by the communication section 73. It should be noted that the held ACR response is transferred to the second screen device 50 by the local web server 44.

[Data Structure of ACR Reference Data]

Figure 4:
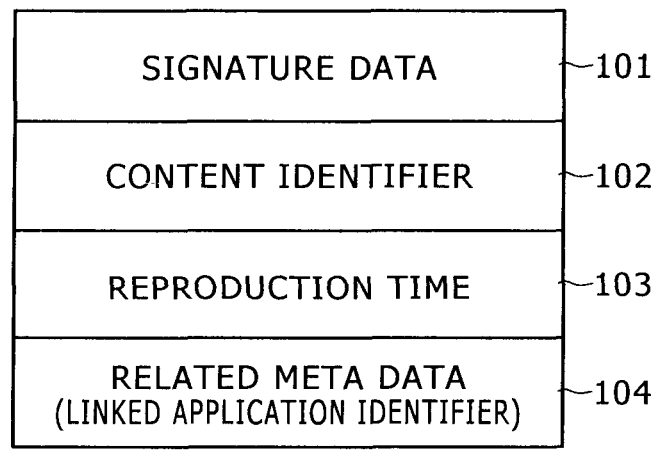
FIG. 4 is a diagram illustrating the data structure of ACR reference data.

FIG. 4 illustrates the data structure of ACR reference data organized into a database in the ACR database 63 of the ACR server 24.

In ACR reference data 100, each piece of signature data 101 extracted at given intervals from content is associated with a content identifier 102, reproduction time 103 and related meta data 104.

The signature data 101 is extracted from content by the signature extraction section 62. The content identifier 102 is information adapted to indicate content from which the signature data 101 was extracted. The reproduction time 103 indicates the progress time of content indicated by the content identifier 102 when the signature data 101 was extracted from the content and is expressed by the elapsed time from the beginning of the content.

The related meta data 104 contains meta data of content indicated by the content identifier 102, an application identifier indicating a linked application to be executed in step with the progress time of the content indicated by the reproduction time 103 of the content and a variety of data used by the executed linked application.

It should be noted that the related meta data 104 may contain different information according to the progress time of the content indicated by the reproduction time 103.

[Data Structure of ACR Query]

Figure 5:
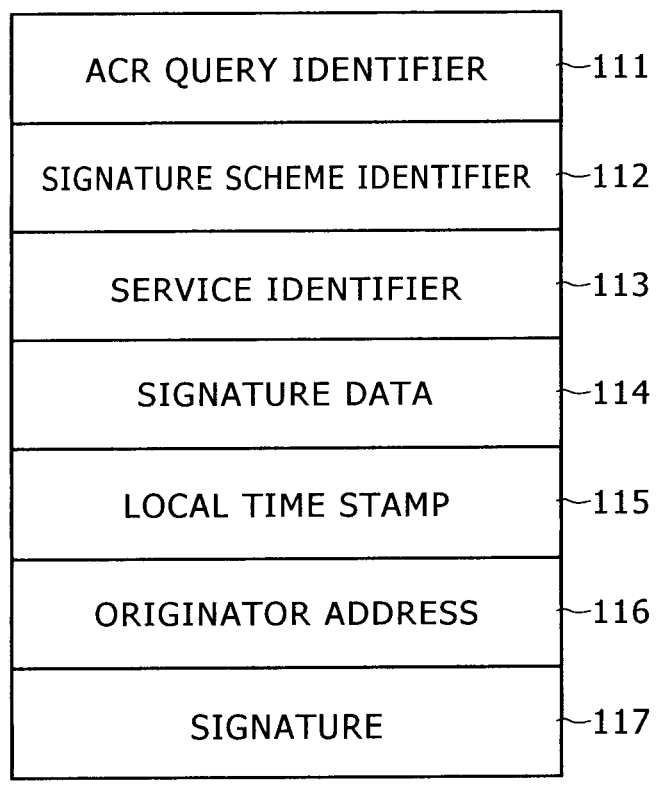
FIG. 5 is a diagram illustrating the data structure of an ACR query.

FIG. 5 illustrates the data structure of an ACR query generated by the ACR query generation section 72 of the ACR client 42.

An ACR query 110 includes an ACR query identifier 111, signature scheme identifier 112, service identifier 113, signature data 114, local time stamp 115, originator address 116 and signature 117.

The ACR query identifier 111 uniquely identifies the ACR query 110. The signature scheme identifier 112 is information adapted to identify the extraction scheme used to extract the signature data 114. The service identifier 113 is information adapted to select the ACR server 24 to which to transmit the ACR query 110 and from which to receive an ACR response if there are the plurality of ACR servers 24.

The signature data 114 is extracted from content by the signature extraction section 71 of the ACR client 42. The local time stamp 115 indicates the time when the signature data 114 was extracted from the content and is expressed by the time indicated by the local system clock of the content reproduction device 40.

The originator address 116 is an address of the ACR client 42 adapted to transmit the ACR query 110 in the bidirectional communication network 12 and is used as information indicating the destination to which to return an ACR response which is generated by the ACR server 24 in response to the ACR query 110. The signature 117 is designed to deter the tampering of the ACR query 110. It should be noted that the ACR query 110 may be transmitted after being encrypted.

[Data Structure of ACR Response]

FIGS. 6A and 6B illustrate the data structure of an ACR response generated by the ACR response generation section 64 of the ACR server 24.

An ACR response 120 has a data structure shown in FIG. 6A or 6B. FIG. 6A illustrates the data structure of the ACR response 120 used when content from which the signature data 114, included in the ACR query 110, was extracted has been successfully identified, i.e., when content being viewed on the content reproduction device has been successfully identified. FIG. 6B illustrates the data structure of the ACR response 120 when content has failed to be identified.

The ACR response 120 (FIG. 6A) used when content being viewed on the content reproduction device 40 has been successfully identified includes an ACR query identifier 121, signature scheme identifier 122, service identifier 123, content identifier 124, reproduction time 125, local time stamp 126, related meta data 127, originator address 128 and signature 129.

On the other hand, the ACR response 120 (FIG. 6B) used if content being viewed on the content reproduction device 40 has failed to be identified includes the ACR query identifier 121, service identifier 122, originator address 128, signature 129 and identification failure flag 130.

The ACR query identifier 121, signature scheme identifier 122, service identifier 123 and local time stamp 126 are designed to identify the ACR query 110 that requested the ACR response 120 to be returned. The ACR query identifier 111, signature scheme identifier 112, service identifier 113 and local time stamp 115 of the ACR query 110 are quoted and described.

The content identifier 124, reproduction time 125 and related meta data 127 are designed to indicate the identification result of content. The content identifier 102, reproduction time 103 and related meta data 104 of the associated ACR reference data 100 are quoted and described.

The originator address 128 is the address of the ACR server 24 adapted to transmit the ACR response 120 in the bidirectional communication network 12. The signature 129 is designed to deter the tampering of the ACR response 120. It should be noted that the ACR response 120 may be transmitted after being encrypted to deter the tampering.

The identification failure flag 130 indicates that content from which the signature data 114, included in the ACR query 110 from the ACR client 42, was extracted, i.e., content being viewed on the content reproduction device 40, has failed to be identified at the ACR server 24.

[Process Performed by the Home Network System 30 of the ACR Service Utilization System 10]

A description will be given next of the process performed by the second screen device 50 making up the home network system 30 to acquire device description, i.e., information about the function available with the content reproduction device 40 (e.g., ACR service in the present embodiment).

FIG. 7 is a flowchart describing the processes performed when the content reproduction device 40 is connected to the network system 30 (also includes when the content reproduction device 40 is activated) with the ACR application 51 already active on the second screen device 50.

In step S1, the UPnP server 43 of the content reproduction device 40 delivers, by multicast, a Notify message defined in UPnP as shown below to the home network system 30. The Notify message is transferred by UDP/IP and received, in this case, by the ACR application 51 of the second screen device 50.

---

NOTIFY*HTTP/1.1

...

LOCATION"http://192.168.0.4:55500"

...

---

The source address from which a device description of the content reproduction device 40 is to be acquired is described in the LOCATION header of the Notify message. In step S11, therefore, the ACR application 51 of the second screen device 50 acquires the device description from the source address using HTTP GET.

Figure 8:
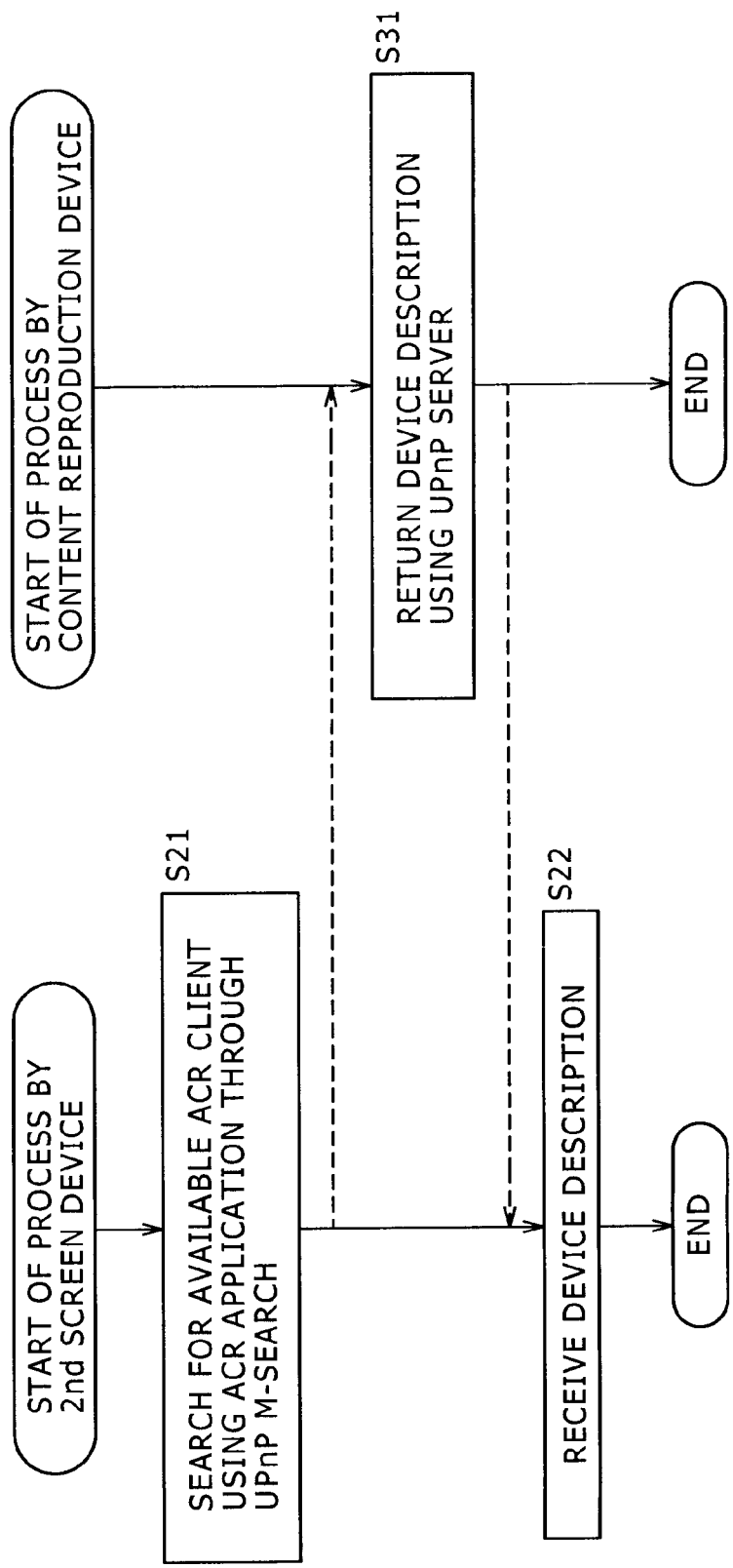
FIG. 8 is a flowchart describing preprocesses performed by the home network system.

Next, FIG. 8 is a flowchart describing the processes performed in the case where the ACR application 51 is activated on the second screen device 50 later with the content reproduction device 40 already connected to the network system 30 and active.

In this case, a Notify message has already been delivered by multicast by the UPnP server 43 of the content reproduction device 40. Therefore, the ACR application 51 of the second screen device 50 cannot receive the Notify message. As a result, in step S21, the ACR application 51 searches for an available ACR client using M-Search defined in UPnP.

In step S31, the UPnP server 43 of the content reproduction device 40 returns device description in response to the M-Search. In step S22, the ACR application 51 receives the device description.

[Example of Device Description]

A description will be given here of an example of device description. An XML file is, for example, used to describe a device description.

A first example of device description is shown below.

The first example of device description

---

```
<root xmlns="urn:schemas-upnp-org:device-1-0">
...
<serviceList>
  <service>
    <serviceType>"urn:abc:service:ACRClient.v1"</serviceType>
    (indicates the ACR client service)
    <serviceId>"urn:UPnP:serviceId:1234"</serviceId>(indicates
    the service ID of ACR client service)
    <SCPDURL></SCPDURL>
    <controlURL>"http://192.168.0.4:55500/getACRResponse"
    </controlURL>
    ...
  </service>
</serviceList>
...
</root>
```

---

It should be noted that the source address from which a service description, described in relation to the ACR service available for the ACR client 42, is to be acquired is described in the <SCPDURL> element of an existing and common device description defined in UPnP. The ACR application 51 acquires the service description from the source address using HTTP GET. Further, the ACR application 51 sends an action message to the URL described in the <controlURL> element using SOAP defined in UPnP, thus invoking actions (transmission of an ACR query and transfer of an ACR response in this case).

In the present embodiment, however, the device description defined in UPnP is expanded as described above to directly describe WebAPI adapted to invoke actions in the device description, thus making it possible to invoke actions with a smaller number of steps.

More specifically, for example, the <SCPDURL> element is left blank as in the first example shown above. Alternatively, a given dummy character string is described, and the server-side script URL (http://192.168.0.4:55500/getACRResponse in the case of the first example) of the WebAPI is directly described in the <controlURL> element.

Still alternatively, a <WebAPIURL> element, not defined in UPnP, may be provided anew as shown below in the second example so that the server-side script URL of the WebAPI is directly described in the <WebAPIURL> element.

The second example of the device description

```
<root xmlns="urn:schemas-upnp-org:device-1-0">
...
<serviceList>
  <service>
    <serviceType>"urn:abc:service:ACRClient.v1"</serviceType>
    (indicates the ACR client service)
    <serviceId>"urn:UPnP:serviceId:1234"</serviceId>(indicates
    the service ID of ACR client service)
    <SCPDURL></SCPDURL>
    <controlURL></controlURL>
    <WebAPIURL>"http://192.168.0.4:55500/getACRResponse"
    </WebAPIURL>
    ...
  </service>
</serviceList>
```

The ACR application 51 of the second screen device 50 that has acquired a device description in the first or second example can execute an action by invoking getACRResponse, i.e., the server-side script URL of the WebAPI described in the <controlURL> or <WebAPIURL> element in the device description, using HTTP GET. More specifically, the ACR client 42 of the content reproduction device 40 is activated first if not active. Then, the ACR client 42 can be caused to transmit the ACR query 110 and transfer the ACR response 120 returned in response to the ACR query 110. It should be noted that the ACR response 120 is transferred, for example, by describing, in JSON, as follows in the body of the HTTP response returned in response to the WebAPI.

HTTP/1.1 200 OK
Content-Type: application/json; charset=utf-8
. . .
"Details of the ACR response encoded in JSON"

The transaction using the WebAPI is repeated by polling while the content is viewed. The related meta data 127 and other data of the ACR response 120 to be converted on an as-needed basis according to the progress of content are presented to the user by the second screen device 50.

As described above, it is possible to operate the content reproduction device 40 and second screen device 50 that are manufactured and sold by different vendors in a coordinated manner by expanding and standardizing a device description.

It should be noted that WebSocket standardized by IETF (Internet Engineering Task Force) or other may be used rather than WebAPI. If WebSocket is used, a WebSocket server is provided in the local web server 44 (or ACR client 42 or second screen device 50). Next, a session (TCP connection) establishment request is issued from each of the ACR application 51 and ACR client 42 via the WebSocket server, thus establishing a session. Then, the ACR response 120 is transferred in the session in JSON or other format.

In this case, as soon as the ACR client 42 receives the new ACR response 120 from the ACR server 24, the ACR response 120 is transferred to the ACR application 51 via the established session. This eliminates the need for polling, which is required when WebAPI is used, thus allowing for instant transfer of the ACR response 120 independent of polling intervals.

[Operation of the ACR Service Utilization System 10]

A description will be given next of the ACR service utilization system 10.

It should be noted that we assume, as a precondition for the operation described below, that the ACR application 51 of the second screen device 50 has already acquired a device description from the UPnP server 43 of the content reproduction device 40 in the home network system 30.

Further, we assume that the ACR reference data 100 associated with a variety of content that can be viewed on the content reproduction device 40 has been generated by the ACR server 24 of the provider system 20 and registered in the ACR database 63.

Figure 9:
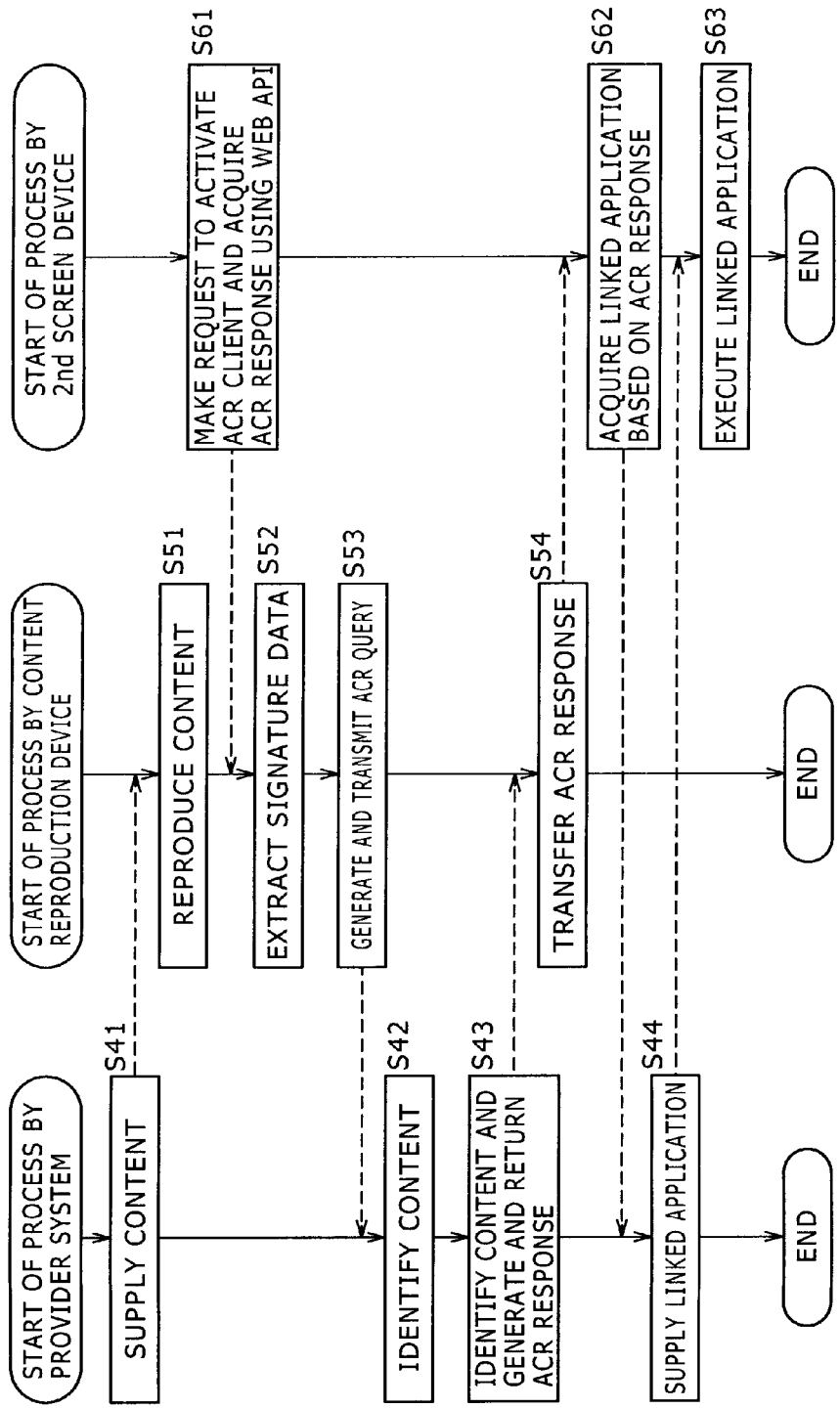
FIG. 9 is a flowchart describing the operation of the ACR service utilization system.

FIG. 9 is a flowchart describing the operation of the ACR service utilization system 10.

In step S41, the content server 21 of the provider system 20 begins to transmit content via the broadcasting network 11.

In the home network system 30, on the other hand, the content reproduction device 40 begins to receive and reproduce the content in step S51. Here, when the ACR application 51 of the second screen device 50 requests an action of the ACR client 42 by invoking WebAPI in step S61, the ACR client 42 and others begin to operate under control of the local web server 44 in response to the request.

That is, in step S52, the content renderer 41 acquires the content being viewed, diverting and supplying the content to the ACR client 42. The signature extraction section 71 of the ACR client 42 extracts the signature data 114 from the content, outputting the signature data 114 to the ACR query generation section 72. In step S53, the ACR query generation section 72 generates the ACR query 110 including the signature data 114, and the communication section 73 transmits the generated ACR query 110 to the ACR server 24.

After the ACR server 24 receives the ACR query 110 from the ACR client 42, the ACR response generation section 64 references the ACR database 63 in step S42, identifying the content associated with the signature data 114 included in the received ACR query 110. Further, the ACR response generation section 64 generates the ACR response 120 appropriate to the identification result of the content, and the communication section 65 returns the generated ACR response 120 to the ACR client 42.

After receiving the ACR response 120 from the ACR server 24, the ACR client 42 supplies the received ACR response 120 to the local web server 44 in step S54. The local web server 44 transfers the ACR response 120 to the ACR application 51 of the second screen device 50. After receiving the transferred ACR response 120, the ACR application 51 analyzes the related meta data 127 included in the ACR response 120 in step S62, causing the linked application manager 52 to acquire the linked application to be executed in step with the progress of the content being viewed.

In step S63, the linked application manager 52 acquires and executes the linked application supplied by the application server 23 as a process performed in step S44. It should be noted that if the linked application has already been acquired, the acquisition thereof can be omitted. Further, if the linked application has already been activated, the activation thereof can be omitted. Still further, information included in the related meta data 127 may be presented to the user without executing the linked application.

The processes from step S41 to step S44, those from step S51 to step S54, and those from step S61 to step S63 are repeated during viewing of the content. This makes it possible to operate the linked application in step with the progress of the content being viewed.

Incidentally, the content server 21 to ACR server 24 of the provider system 20 and the content reproduction device 40 and second screen device 30 of the home network system 30 adapted to perform the above series of processes may each include a piece of hardware. Alternatively, each of these may be implemented by a computer executing software. This computer includes a computer incorporated in dedicated hardware and a general-purpose personal computer capable of performing various functions when installed with various programs.

Figure 10:
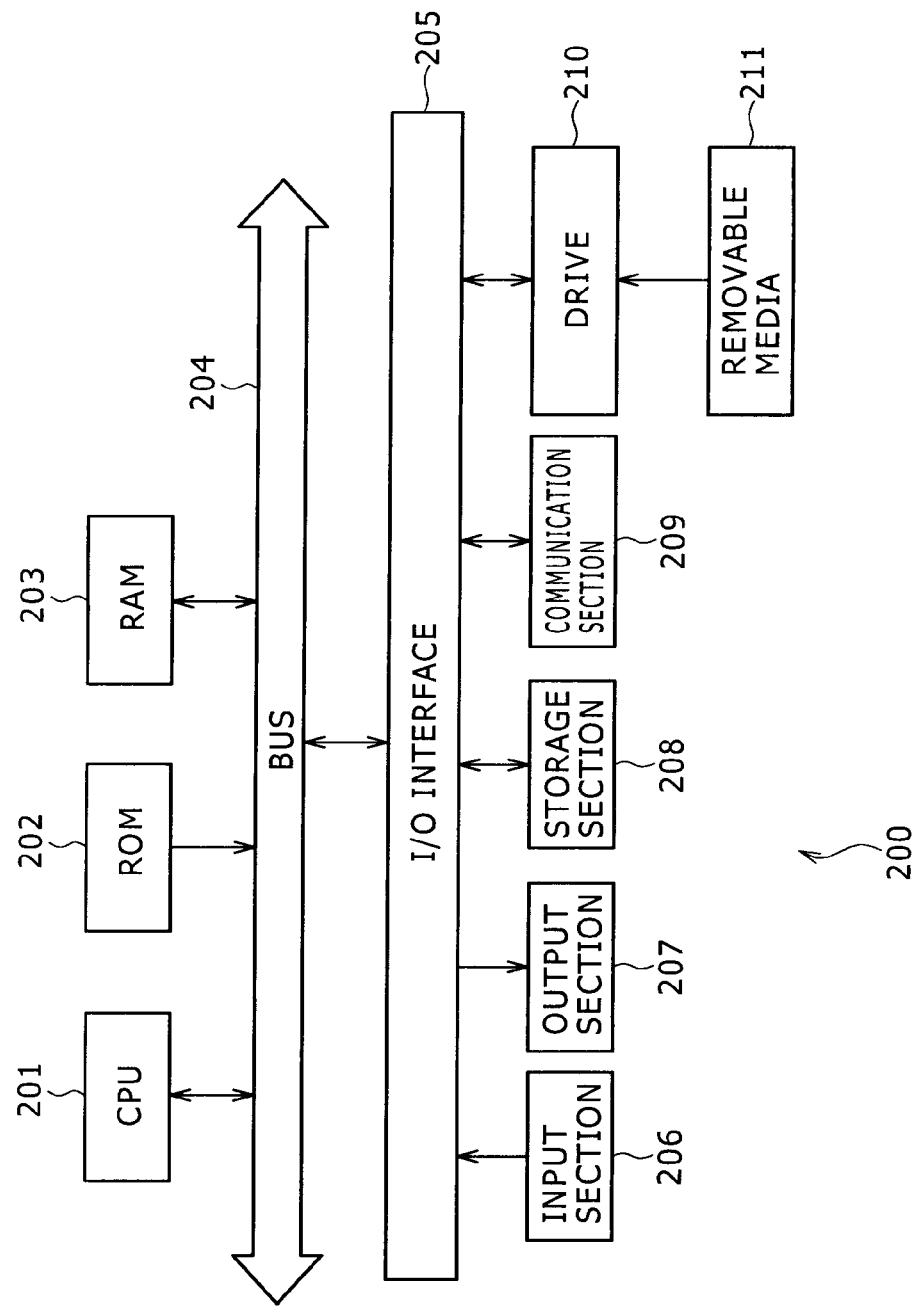
FIG. 10 is a block diagram illustrating a configuration example of a computer.

FIG. 10 is a block diagram illustrating a configuration example of the computer hardware described above.

In a computer 200, a CPU (Central Processing Unit) 201, ROM (Read Only Memory) 202 and RAM (Random Access Memory) 203 are connected to each other via a bus 204.

An I/O interface 205 is also connected to the bus 204. An input section 206, output section 207, storage section 208, communication section 209 and drive 220 are connected to the I/O interface 205.

The input section 206 includes a keyboard, mouse, microphone or the like. The output section 207 includes a display, speaker or the like. The storage section 208 includes a hard disk, non-volatile memory or the like. The communication section 209 includes a network interface or the like. The drive 220 drives a removable media 211 such as magnetic disk, optical disk, magneto-optical disk, or semiconductor memory.

In the computer 200 configured as described above, the CPU 201 loads, for example, the program stored in the storage section 208 into the RAM 203 for execution via the I/O interface 205 and bus 204, thus performing the above series of processes.

The program executed by the computer 200 (CPU 201) can be supplied, for example, recorded on the removable media 211 such as package media. Alternatively, the program can be supplied via a wired or wireless transmission media such as local area network, the Internet or digital satellite broadcasting.

In the computer 200, the program can be installed to the storage section 208 via the I/O interface 205 by inserting the removable media 211 into the drive 220. Alternatively, the program can be installed to the storage section 208 by receiving the program with the communication section 209 via a wired or wireless transmission media. Still alternatively, the program can be preinstalled in the ROM 202 or storage section 208.

It should be noted that the program executed by the computer 200 may perform the processes chronologically according to the sequence described in the present specification or perform the processes in parallel or when necessary as when invoked.

The embodiment of the present disclosure is not limited to that described above, but may be modified without departing from the spirit and scope of the present disclosure.

What is claimed is:

1. An information processor making up a home network system together with a terminal device, the information processor comprising:
   circuitry configured to
      provide, to the terminal device, a command for the terminal device to send back to the information processor to cause an identification function to be executed by the circuitry of the information processor;
      execute the identification function that is configured to extract, from content processed for display to a user, signature data indicating a feature of the content, generate a query including at least the extracted signature data, and transmit the query to an identification server;
      receive a response indicating the identification result of the content returned from the identification server in response to the query; and
      transfer the response received from the identification server to the terminal device, wherein
      the identification function is executed in response to receiving the command back from the terminal device.

2. The information processor of claim 1, wherein the circuitry is configured to
   provide, to the terminal device, a device description in which a URL of the command is directly described.

3. The information processor of claim 2, wherein the circuitry is configured to
   directly describe the URL of the command in the device description with a predetermined element and provide the device description to the terminal device.

4. The information processor of claim 2, wherein
   the command is WebAPI or WebSocket.

5. The information processor of claim 2, wherein the circuitry is configured to
   deliver a Notify message by multicast in the home network and provide the device description to the terminal device in response to access from the terminal device based on the Notify message.

6. The information processor of claim 2, wherein the circuitry is configured to
   provide the device description to the terminal device in response to M-Search from the terminal device.

7. The information processor of claim 2, wherein
   the response includes related meta data associated with the identified content.

8. An information processing method of an information processor that makes up a home network system together with a terminal device, the method comprising;
   providing, to the terminal device, a command for the terminal device to send back to the information processor to cause an identification function to be executed by circuitry of the information processor;
   executing, by the circuitry of the information processor, the identification function that is configured to extract, from content processed for display to a user, signature data indicating a feature of the content, generate a query including at least the extracted signature data, and transmit the query to an identification server;

receiving a response indicating the identification result of the content returned from the identification server in response to the query; and transferring the response received from the identification server to the terminal device, wherein the identification function is executed in response to receiving the command back from the terminal device.

9. A non-transitory computer-readable medium storing a program which when executed by a computer causes the computer, making up a home network system together with a terminal device, to:

provide, to the terminal device, a command for the terminal device to send back to the computer to cause an identification function to be executed by the computer;

execute the identification function that is configured to extract, from content processed for display to a user, signature data indicating a feature of the content, generate a query including at least the extracted signature data, and transmit the query to an identification server;

receive a response indicating the identification result of the content returned from the identification server in response to the query; and transfer the response received from the identification server to the terminal device, wherein the identification function is executed in response to receiving the command back from the terminal device.

10. An information processor making up a home network system together with a content reproduction device, the content reproduction device including first circuitry configured to execute an identification function that is configured to extract, from content processed for display to a user, signature data indicating a feature of the content, generate a query including at least the extracted signature data, and transmit the query to an identification server, the first circuitry being configured to receive a response indicating the identification result of the content returned from the identification server in response to the query, the information processor comprising;

second circuitry configured to acquire from the content reproduction device a command for the information processor to send back to the content reproduction device to cause the identification function of the content reproduction device to be executed, provide the command to the content reproduction device to invoke the identification function, receive the response from the identification server and transferred from the content reproduction device, and acquire and execute a linked application to be executed with the progress of the content based on related meta data included in the received response and associated with the identified content, wherein the identification function is executed by the first circuitry in response to the content reproduction device receiving the command back from the information processor.

11. The information processor of claim 10, wherein the second circuitry is configured to acquire a URL of the command directly described in a device description provided by the content reproduction device.

12. The information processor of claim 11, wherein the second circuitry is configured to acquire the URL of the command directly described in the device description with a predetermined element provided by the content reproduction device.

13. The information processor of claim 11, wherein the command is WebAPI or WebSocket.

14. The information processor of claim 11, wherein the second circuitry is configured to acquire the device description from the content reproduction device based on a Notify message delivered by multicast in the home network by the content reproduction device.

15. The information processor of claim 11, wherein the second circuitry is configured to acquire the device description searched for through M-Search and supplied from the content reproduction device.

16. The information processor of claim 11, wherein the circuitry is configured to provide, to the user, meta data of the content based on related meta data included in the received response and associated with the identified content.

17. An information processing method of an information processor that makes up a home network system together with a content reproduction device, the content reproduction device including first circuitry configured to execute an identification function that is configured to extract, from content processed for display to a user, signature data indicating a feature of the content, generate a query including at least the extracted signature data, and transmit the query to an identification server, the first circuitry being configured to receive a response indicating the identification result of the content returned from the identification server in response to the query; the information processing method comprising;

acquiring from the content reproduction device, by second circuitry of the information processor, a command for the information processor to send back to the content reproduction device to cause the identification function of the content reproduction device to be executed;

providing the command to the content reproduction device to invoke the identification function;

receiving the response from the identification server and transferred from the content reproduction device; and acquiring and executing, by the second circuitry, a linked application to be executed with the progress of the content based on related meta data included in the received response and associated with the identified content, wherein the identificaton function is executed by the first circuitry in response to the content reproduction device receiving the command back from the information processor.

18. A non-transitory computer-readable medium storing a program which when executed by a computer causes the computer, making up a home network system together with a content reproduction device, to;

acquire from the content reproduction device a command for the computer to send back to the content reproduction device to cause an identification function of the content reproduction device to be executed, provide the command to the content reproduction device to invoke the identification function, receive a response from an identification server and transferred from the content reproduction device; and acquire and execute a linked application to be executed with the progress of the content based on related meta data included in the received response and associated with identified content, wherein the content reproduction device includes circuitry configured to execute the identification function that is configured to extract, from content processed for display to a user, signature data indicating a feature of the content, generate a query including at least the extracted signature data, and transmit the query to the identification server, the circuitry is configured to receive the response indicating the identification result of the content returned from the identification server in response to the query, and the identification function is executed by the circuitry in response to the content reproduction device receiving the command back from the computer.

19. An information processing method of a home network system made up of a content reproduction device and terminal device, the content reproduction device including first circuitry configured to execute an identification function configured to extract, from content processed for display to a user, signature data indicating a feature of the content, generate a query including at least the extracted signature data and transmit the query to an identification server, the first circuitry being configured to receive a response indicating the identification result of the content returned from the identification server in response to the query, the information processing method comprising:

providing, by the first circuitry, a command for the terminal device to send back to the content reproduction device to cause the identification-function to be executed by the first circuitry;

receiving, by second circuitry of the terminal device, the command provided by the content reproduction device;

providing, by the second circuitry, the command to the content reproduction device to invoke the identification function;

executing, by the first circuitry, the identification function in response to receiving the command back from the terminal device;

transferring the response received from the identification server to the terminal device; and receiving, by the second circuitry, the transferred response and acquiring and executing a linked application to be executed with the progress of the content based on related meta data included in the response and associated with the identified content.

* * * * *